United States Patent [19]
Everaerts et al.

[11] Patent Number: 5,858,545
[45] Date of Patent: Jan. 12, 1999

[54] ELECTROSPRAYABLE RELEASE COATING

[75] Inventors: Albert I. Everaerts, Oakdale; Mieczyslaw H. Mazurek, Roseville; Albert E. Seaver, Woodbury, all of Minn.

[73] Assignee: Minnesota Mining and Manufacturing Company, St. Paul, Minn.

[21] Appl. No.: 622,075

[22] Filed: Mar. 26, 1996

[51] Int. Cl.$^6$ .............. C08L 43/04; B32B 9/04; F21V 7/22; C08J 3/28

[52] U.S. Cl. .......... 428/447; 428/451; 428/452; 442/67; 442/81; 522/31; 522/40; 522/41; 522/42; 522/43; 522/44; 522/46; 522/60; 522/62; 522/99; 522/148; 523/172; 523/300

[58] Field of Search .............. 522/31, 99, 148, 522/40, 41, 42, 43, 44, 46, 60, 62; 523/172, 300; 428/447, 451, 452; 442/67, 81

[56] References Cited

U.S. PATENT DOCUMENTS

| | | | |
|---|---|---|---|
| 3,348,965 | 10/1967 | Drum | 117/93.4 |
| 4,059,444 | 11/1977 | Lu et al. | 96/1 |
| 4,097,417 | 6/1978 | Pastor et al. | 252/501 |
| 4,303,924 | 12/1981 | Young, Jr. | 346/1.1 |
| 4,486,504 | 12/1984 | Chung | 428/412 |
| 4,748,043 | 5/1988 | Seaver et al. | 427/30 |
| 4,908,274 | 3/1990 | Jachmann t al. | 428/452 |
| 5,326,598 | 7/1994 | Seaver et al. | 427/473 |
| 5,364,726 | 11/1994 | Morrison et al. | 430/115 |
| 5,397,673 | 3/1995 | Watson et al. | 430/126 |
| 5,425,991 | 6/1995 | Lu | 428/352 |

FOREIGN PATENT DOCUMENTS

| | | | |
|---|---|---|---|
| 0 461 320 A1 | 12/1991 | European Pat. Off. | C09D 4/00 |
| 583259 | 1/1996 | European Pat. Off. | |
| 2 170 215 | 9/1973 | France | C09D 7/12 |
| WO 92/16590 | 10/1992 | WIPO | C09J 7/02 |
| WO 94/07612 | 4/1994 | WIPO | B05D 1/04 |
| WO94/07965 | 4/1994 | WIPO | |
| WO 95/03338 | 2/1995 | WIPO | C08F 4/00 |
| WO 96/27584 | 9/1996 | WIPO | C07C 317/04 |

OTHER PUBLICATIONS

ASTM D 5403–93, Standard Test Methods for Volatile Content of Radiation Curable Materials, 1993.
ASTM D 4061–89, Standard Test Method for Retroreflectance of Horizontal Coatings, 1981.

*Primary Examiner*—Susan W. Berman
*Attorney, Agent, or Firm*—Lisa M. Fagan

[57] ABSTRACT

Free-radically polymerizable release coating compositions containing conductivity enhancers, which are capable of being electrosprayed onto a substrate. The compositions comprise (a) about 100 parts by weight of one or more free-radically polymerizable vinyl monomer(s), (b) from about 0.05 to about 250 parts by weight of one or more polydiorganosiloxane polymer(s) copolymerizable with the vinyl monomer(s), and (c) from about 0.10 to about 10 parts by weight, based on 100 parts by weight of (a) and (b), of one or more non-volatile conductivity enhancer(s), which are soluble in the monomer(s) and which do not interfere with polymerization, wherein the composition may be electrosprayed.

The composition may further comprise from about 0.1 to about 5 parts by weight of one or more initiator(s) based on 100 parts by weight of monomer(s) and polydiorganosiloxane polymer(s).

Another embodiment of the present invention further comprises at least 0.1 part by weight, based on 100 parts by weight of monomer(s) and polydiorganosiloxane polymer(s), of one or more dissociation enhancing agent(s) soluble in the monomer(s).

32 Claims, No Drawings

ELECTROSPRAYABLE RELEASE COATING

FIELD OF INVENTION

This invention relates to release coating compositions capable of being electrosprayed onto a substrate. More particularly, the present invention relates to free-radically polymerizable release coatings containing conductivity enhancers, substrates coated with these compositions, and a method for coating the substrates.

BACKGROUND OF INVENTION

The release of chemicals into the atmosphere, often polluting the air is of substantial concern. Thus, in the chemical industry as new products and processes are developed, a key factor is the environmental effect. One means of reducing chemical emissions is to develop solvent-free processes, and to require that chemicals do not evaporate during processing or from the final product.

Traditionally, release coatings have been solvent-borne thin coatings, i.e., dry thickness below about 5 micrometers. For continuous liquid coating techniques, the composition typically has been diluted with a large amount of a solvent that is later removed by evaporation, leaving behind the composition at the desired thickness. The uniformity and thickness of the dried final layer may be difficult to control especially on rough surfaces. The added solvent leads to higher material costs, preparation costs, and solvent removal costs. In addition, the solvents typically used may be hazardous to the environment.

Solvent-borne thin coatings may also be applied by spray processes. Although spray coating may be used to apply a composition to a smooth substrate, it is particularly useful as a method of coating a rough or three-dimensional substrate. A problem associated with conventional spray processes is poor coating efficiency where a substantial amount of the coating composition does not land on the substrate. However, electrostatic spray processes provide a more controlled means of spraying, and thus reduce material loss. Electrospray, a distinct subclass within electrostatic spraying, may be used to apply a thin coating even without a solvent. Typically, electrospray can be used to apply a coating with a thickness from about 0.005 micrometers to about 10 micrometers.

Although the electrospray process is an effective means of applying a thin coating, not every composition can be electrosprayed. The composition must meet certain processing requirements. Among the requirements for electrospray are that the composition be essentially a single phase solution and not a dispersion (solids-in-liquid) or emulsion (liquid-in-liquid), that the composition have sufficient conductivity, and that the composition have a relatively low viscosity.

Although a composition with a conductivity between $10^{-7}$ siemens per meter (S/m) and $10^{-1}$ S/m can be electrosprayed, for thin coatings the droplets preferably are relatively small which requires a conductivity greater than $10^{-6}$ S/m or 1 microsiemens per meter ($\mu$S/m). Likewise, because the range of flow rates where a solution can be electrosprayed decreases with increasing conductivity, to obtain flow rates desirable in production the conductivity preferably is held below about $10^{-3}$ S/m (1000 $\mu$S/m).

Compositions can be electrosprayed with or without a solvent, provided the composition is either a single phase solution or a non-ionically-stabilized emulsion or dispersion. If the composition is not essentially a single phase solution, the composition may become unstable during the electrospray process. In a single phase solution ("true solution"), each component is completely soluble. Often a solvent must also be added to the composition in order to obtain the requisite solubility. This added solvent, particularly if organic, may present environmental problems if it evaporates during or after processing and is not captured.

When a composition is truly solvent-free, substantially all of the initial components are present in some form in the final cured product. Thin coatings exist which are solvent-cast, but do not fit this definition because the solvent evaporates during processing. For example, although ethanol or methanol can be added to electrosprayable compositions to enhance solubility and conductivity, they evaporate during processing. For some free-radical curing systems, such solvents may interfere with polymerization by serving as chain transfer agents or as inhibitors, and preferably they are removed prior to curing.

Water-based compositions, although sometimes termed solvent-free, typically require large drying ovens, which occupy a sizable portion of manufacturing space and add to the product cost. In addition, often compositions to be electrosprayed are organic, and thus tend to be immiscible with water.

During electrospraying, the sprayhead places charge onto droplets by the principle of electrostatic induction. For inductive charging to work, the conductivity of the spraying composition must be within a specific range.

A solvent can be added to a composition to enhance conductivity. To achieve the desired conductivity range, in addition to containing a conductivity enhancer, i.e., salt, compositions often contain a polar solvent typically considered to be a volatile organic compound (VOC). These volatile organic compounds can be hazardous to the environment.

For electrospray, solvents have been used to increase solution conductivity. For example, EPO Appln No. 92.907947.3 (Mazurek et al.) discloses adding methanol in small quantities to enhance the conductivity of an electrosprayable release coating. However, methanol evaporates during processing, otherwise it may adversely interfere with free-radical polymerization.

U.S. Pat. No. 4,059,444 discloses adding quaternary ammonium salts, which have inorganic anions with relatively low molecular weights, as conductivity enhancers such as sulfate, borate, and iodide, to ink. These conductivity control agents are added at levels of 0.05 to about 1 weight percent to increase the conductivity of electrostatically applied inks.

U.S. Pat. No. 5,364,726 discloses a liquid developer comprising a colorant and a curable liquid vehicle, solid particles containing an initiator which is substantially insoluble, and optionally conductivity enhancing agents such as quaternary ammonium compounds as described in U.S. Pat. No. 4,059,444.

U.S. Pat. No. 4,303,924 discloses adding an oil-soluble salt, such as the mineral acid and organic acid quaternary salts of the Group Va elements, to a curable printing ink containing 0 to 30% of a polar organic solvent. All examples include a polar organic solvent.

To electrospray a thin layer having uniform thickness, each droplet from the electrospray mist preferably has a sufficiently low viscosity to allow for reasonable spreading on the substrate. However, for some applications, it may be desirable to cure individual droplets on the substrate, e.g., slip sheets.

Many release coatings known in the art contain silicones such as polydimethylsiloxane for release properties. Generally, the viscosity of these compositions tends not to be low enough for electrospraying. Thus, solvents have been added to control viscosity. Alternatively, reactive diluents have been added to control viscosity. For example see WO95/23694 (Kidon et al.) and U.S. Pat. No. 4,201,808 (Cully et al.).

Regardless of the method of applying a thin release coating to a substrate, the release coating components preferably do not detrimentally interfere with the final performance of the product. A component preferably does not evaporate or interfere with polymerization or becomes physically trapped in the coating during processing otherwise the component may migrate into the substrate and detrimentally affect the product's performance. Alternatively, an uncured component may later evaporate polluting the environment, or may later contact another surface, rub off, and contaminate that surface. Thus, the need exists for a release coating composition capable of being electrosprayed where substantially all of the components are present in the final product and either co-polymerize with the other components or otherwise become a permanent part of the coating.

SUMMARY OF THE INVENTION

We have found release coating compositions that are capable of being electrosprayed onto a substrate, the components of which do not interfere with polymerization, and when placed upon a substrate and polymerized the compositions do not undersirably degrade the product.

By incorporating conductivity enhancers in accordance with the invention, a composition which was insufficiently conductive for coating via electrospraying may be formulated to achieve the desired conductivity. In addition to achieving adequate conductivity, the conductivity enhancers must be soluble in the composition, not adversely affect the composition's viscosity, preferably either substantially co-polymerize or become a permanent part in the final composition, and not undesirably degrade the final product.

The present invention provides free-radically polymerizable release coating compositions containing conductivity enhancers which are capable of being electrosprayed onto a substrate. The compositions comprise (a) about 100 parts by weight of one or more free-radically polymerizable vinyl monomer(s), (b) from about 0.05 to about 250 parts by weight of one or more polydiorganosiloxane polymer(s) copolymerizable with the vinyl monomer(s), and (c) from about 0.10 to about 10 parts by weight based on 100 parts by weight of (a) and (b) of one or more non-volatile conductivity enhancer(s), which are soluble in the monomer(s) and which do not interfere with polymerization, wherein the composition may be electrosprayed.

The composition may further comprise from about 0.1 to about 5 parts by weight of one or more free-radical initiator(s) based on 100 parts by weight of monomer(s) and polydiorganosiloxane polymer(s).

Optionally at least 0.1 part by weight, based on 100 parts by weight of monomer and polydiorganosiloxane polymer, of one or more dissociation enhancing agent(s) soluble in the monomers may be added. The release coating compositions have viscosities less than one pascal-second and are suitable for electrospraying thin coatings onto a substrate and especially onto a rough or a three-dimensional sheet-like substrate.

Another embodiment of the present invention is a "solvent-free" release coating composition which may be applied to a substrate by electrospray.

Another embodiment of the present invention is a release coating for pavement marking tapes applied by the electrospray process.

DETAILED DESCRIPTION

The addition of certain types of salts, such as ampholytic acid-base pairs or onium salts of Group Va, VIa, or VIIa elements, as conductivity enhancers to an organic mixture comprising free-radically polymerizable monomers significantly enhances the mixture's conductivity without the addition of a solvent. The addition of a conductivity enhancer allows a release coating composition with insufficient conductivity for electrospray to achieve the requisite conductivity and thus be electrosprayable.

A special class of electrostatic coating, generally referred to as electrospray coating, can be used to create coatings which are sub-micrometer to a few micrometers in thickness. As with most electrostatic coating methods, the electrospray process requires free ions (i.e., ions which are physically separated such that they behave as noncoordinated ions) in solution to serve as ionic conductors. Known ionic conductors include salts, acids, water, and polar solvents containing dissociated species. Because of process limitations, electrosprayable compositions are preferably single phase solutions. Water often is not compatible with (i.e., miscible with) an organic solution, and thus such a composition would be an emulsion or dispersion and not a true solution. In addition, water must be dried off, which adds another process step and increases production cost. Acids are often volatile and corrosive. As discussed above, polar solvents may be used to enhance the conductivity by acting as a dissociation enhancing agent. However, polar solvents often evaporate during processing and thus can be harmful to the environment. Therefore, to create a solvent-free composition which is electrosprayable, salts are useful to enhance conductivity. However, not all salts are useful in organic compositions.

A single definition is not universally used for a solvent-free composition or a high-solids solution. Ideally, a solvent-free composition is 100% reactive and does not have or produce any VOCs. As is known in the art, this ideal composition is difficult if not impossible to achieve. In particular, bulk polymerization significantly slows down at higher conversions, and thus 100% conversion or polymerization is difficult to achieve, even without considering economic limitations. To account for the non-ideal nature of compositions, some level of non-reactive components or volatile components is presumed. The U.S. Environmental Protection Agency (EPA) established a test methodology for measuring the VOC content for radiation curable materials, as found in American Society for Testing and Materials (ASTM) standard D 5403-93. Test Method A is applicable to "radiation curable materials that are essentially 100% reactive but may contain traces (no more than 3%) of volatile materials as impurities or introduced by the inclusion of various additives". To determine the presence of volatile materials, the composition is cured and then is heated to 100°±5° C. for 60 minutes in a forced draft oven. Weight measurements are taken (all at room temperature) of the substrate, the composition prior to cure, the composition after cure and the cured composition after heating. In the present invention, "solvent-free" compositions are those that comply with this ASTM standard and thus have a VOC content of no more than 3 percent by weight.

In addition to meeting this standard, the solvent-free compositions of the present invention are preferably such that less than 2 percent by weight of the total of all original components are heat-extractable during the application of ASTM D 5403-93, Test Method A. Thus, preferably at least 98 percent by weight of the monomer(s), initiator(s), conductivity enhancer(s), and other additives are present in the final polymerized product regardless of the energy source used for the free-radical cure. The non-ideal nature of the polymerization is also allowed for in the less than 2 percent by weight loss requirement.

To achieve this solvent-free composition, each component is selected such that during processing, polymerization, and in the final product, the composition does not lose material by evaporation or heat-extraction to the extent of 2 percent by weight or more.

In addition, the components preferably do not undesirably migrate into other layers of the final product, otherwise the product's properties may be detrimentally altered.

Electrospray Process

The composition to be electrosprayed is first turned into a mist of fine charged droplets having diameters typically less than about 50 micrometers. The mist of charged droplets is then directed to some form of substrate, typically a moving web, where the droplets contact the substrate and spread, typically to the point where they eventually coalesce to form the thin coating. (Note, however, that in some applications it may be desirable to cure individual droplets on a substrate, for example, slip sheets.) In the electrospray mist generator, this charged droplet mist is controlled by the design of the sprayhead and by the application of an electrical potential difference within the sprayhead. The electrical potential difference is often called the applied voltage or simply the voltage. The applied voltage causes the composition's free ions of one charge polarity to move to specific locations along the liquid-air interface of the composition within the sprayhead. In one electrospray process, U.S. Pat. No. 5,326,598 (Seaver et al.), the forces caused by the excess of these free ions, which were induced to be at the selected air-liquid surface locations, cause the liquid at these locations to elongate into a series of fine liquid filaments. These liquid filaments, which now contain the free ions of one specific polarity, will in turn break up into a series of charged droplets having a diameter on the order of the original liquid filament diameter. All electrospray generators and many electrostatic spray generators place charge on the droplets by electrostatic induction. These induction generators require that the composition to be sprayed contain a sufficient amount of free ions for the droplets to become charged. The conductivity of the composition must be in the range of about $10^{-7}$ to about $10^{-1}$ S/m, although the preferred conductivity is dependent on the specific coating application. For the release coating composition of the present invention, the conductivity is preferably from about $10^{-6}$ to about $10^{-3}$ S/m (1 to 1000 $\mu$S/m), and most preferably from about 10 to about 50 $\mu$S/m.

Walden's Rule (Jordan, P. C., *Chemical Kinetics and Transport*, Plenum Press, New York (1980)) provides that for a given system the product of the ionic conductivity times the viscosity is approximately a constant. Thus, ionic conductivity can be increased by decreasing viscosity. However, the droplet viscosity preferably is held quite low to allow for reasonable spreading and smoothing of the coating in a short time. Consequently, in electrospray coating, the composition's viscosity is less than 1 pascal-second (Pa·s), with the preferred range less than a few tens of millipascal-seconds (mPa·s). Typically, the viscosity measures from about $10^{-3}$ Pa·s to about 1 Pa·s. Because the viscosity is held low for all induction-type electrostatic generators, the desired conductivity cannot readily be obtained by adjusting the viscosity.

Without the requisite conductivity, a composition cannot be electrosprayed. This substantially limits the use of this application method. However, by adding certain types of salts to these compositions to provide sufficient conductivity, previously non-electrosprayable compositions may now be applied to substrates by electrospray in accordance with the present invention.

Conductivity Enhancers

Salts, as conductivity enhancers, contain ions held together by coulombic attraction. Simply having ions present does not mean that a salt solution is a sufficient conductor of ions. Electrostatic attraction binds oppositely charged ions together into ion pairs substantially precluding ionic conductivity. Therefore, to be sufficient conductors the ion pairs must at least partially dissociate and the ions become independent, i.e., become free ions (or, less preferably, ion triplets). Free ions can significantly increase the ionic conductivity of a composition provided they have enough inherent mobility to respond readily to the electrical field applied to the composition. The ability of the ion pairs to dissociate in a composition depends on several factors such as the dielectric constant of the medium.

As with the other components, the ion pairs must be soluble in the mixture to form a true solution in order for the composition to be potentially electrosprayable. Ions are required for various monomer mixtures to become conductive, but the solubilities of the salts differ, making some salts more effective than others. Because the release coating composition of interest is organic, salts with at least one organic ion typically have better solubilities. The solubility of such an organic salt can be tailored by the proper selection of the organic group.

Generally, materials with higher dielectric constants (higher polarity) are better able to stabilize free ions. Polar materials reduce the attraction between oppositely charged ions, allowing the ion pairs to separate into free ions. In general, dissolved salt ions may be tightly paired (coordinated), and thus essentially non-conductive, or may be (as a result of their structure and environment) readily physically separated such that the ions behave as noncoordinated (or free) ions which are substantially conductive. As organic compositions become less polar and thus have a lower dielectric constant, the equilibrium between the free ions and the tight ion pairs shifts toward the latter. Therefore, salts dissolving to form ion pairs which readily dissociate into free ions despite less favorable conditions (i.e., low polarity and low dielectric constant mixtures) are desirably selected to enhance conductivity.

It is believed that the ease of dissociative separation of two ions is favorably influenced by charge delocalization in one or both of the ions and/or by steric hindrance around the charge center which prevents the counter-ions from tightly coordinating into an ion pair. Steric hindrance around the charge site of the ion can diminish accessibility to the counter-ion and therefore ions tend to be paired less tightly. If sterically hindering groups do not interfere with salt solubility, greater steric hindrance will favor ion-pair separation into individual ions and tend to enhance the composition's conductivity. However, increased ionic size will eventually reduce conductivity due to reduction in ion mobility.

Ions can have multiple charges. Generally, monovalent ions more readily solubilize and dissociate into free ions with the selected monomer mixtures. Bivalent and trivalent ions may also be used, but unless well "stabilized" are generally less preferred because the extra charge favors tight ion aggregation over longer distances. Polymeric ions, such as from a salt of polyacrylic acid, are severely restricted in mobility, and thus, limited in conductivity especially in viscous media.

The conductivity enhancers of the invention are non-volatile, or their vapor pressures are 1 kPa or less at 25° C., preferably less than 0.5 kPa at 25° C., and more preferably less than 0.1 kPa at 25° C. Preferably, the conductivity enhancers do not decompose to form volatiles, or become heat extractable at any time during processing or from the final product. Preferably, the conductivity enhancers should increase the composition's conductivity when added in relatively low amounts. Typically from about 0.10 parts by weight to about 10 parts by weight, based on 100 parts by weight monomer(s) and polydiorganosiloxane polymer(s), of conductivity enhancer(s) are added, preferably from about 0.5 parts by weight to about 5 parts by weight, based on 100 parts by weight monomer(s) and polydiorganosiloxane polymer(s), of conductivity enhancer(s) are added. Further, the conductivity enhancer(s) must not interfere with polymerization of the composition. Conductivity enhancers useful in the present invention include ampholytic acid-base pairs and onium salts of group Va, VIa, or VIIa elements. Preferably, at least one part of the ampholytic acid-base pair or one part of the onium salt of group Va, VIa, or VIIa elements of the selected conductivity enhancer is copolymerizable with the rest of the composition. However, if the conductivity enhancers are added in a small quantity and are physically trapped within the cured composition and thus do not migrate to other layers of the substrate, evaporate, or become extractable when heated, the conductivity enhancers need not copolymerize. Migrating conductivity enhancers may undesirably interfere with the final product's properties.

Suitable ampholytic acid/base pairs include N,N-dimethyl aminoethyl(meth)acrylate/(meth)acrylic acid; methacrylic acid/diethanolamine; acrylic acid/2-vinylpyridine; itaconic acid/2-diethylaminoethyl acrylate; methacrylic acid/2-diethylaminoethyl acrylate; acrylic acid/2-diethylaminoethyl acrylate; acrylic acid/2-diethylaminoethyl methacrylate; N-vinylglycine; p-styrenesulfonic acid/4-vinylpyridine; ethylenesulfonic acid/4-vinylpyridine; 1-vinyl-3-(3-sulfopropyl)imidazolium hydroxide inner salt; 1-vinyl-2-methyl-3-(3-sulfopropyl) imidazolium hydroxide inner salt; 1-vinyl-3-(4-sulfobutyl) imidazolium hydroxide inner salt; 1-vinyl-2-methyl-3-(4-sulfobutyl) imidazolium hydroxide inner salt; 1-vinyl-3-(2-sulfobenzyl)imidazolium hydroxide inner salt; 2-vinyl-1-(3-sulfopropyl)pyridinium hydroxide inner salt; 2-methyl-5-vinyl-1-(3-sulfopropyl) pyridinium hydroxide inner salt; 4-vinyl-1-(3-sulfopropyl)pyridinium hydroxide inner salt; dimethyl-(2-methacryloxyethyl)(3-sulfopropyl)ammonium hydroxide inner salt; diethyl-(2-methacryloyloxyethoxy-2-ethyl)(3-sulfopropyl)ammonium hydroxide inner salt; 4-vinyl-4-(sulfobutyl)pyridinium hydroxide inner salt; 2-vinyl-2-(4-sulfobutyl)pyridinium hydroxide inner salt; N-(3-sulfopropyl)-N-methacrylamido-propyl-N,N-dimethylammonium betaine; N-(3-carboxypropyl)-N-methacrylamido-ethyl-N,N-dimethylammonium betaine; 4-vinylpiperidinium ethanecarboxy-betaine; 4-vinylpyridinium methanecarboxy-betaine; 4-vinylpyridinium/p-styrenesulfonate; 4-vinyl-N-methylpyridinium/p-styrenesulfonate; 2-methacryloylethyltrimethylammonium/2-methacryloyloxyethanesulfonate; and the like (see for example Polymer Science and Engineering, vol. 11, page 514 under polyampholytes).

Onium salts which are useful as conductivity enhancers have the general formula:

wherein at least one R is a hydrocarbon having from about 1 to about 18 carbon atoms and each other R is a hydrogen or a hydrocarbon having from about 1 to about 18 carbon atoms, preferably all Rs are hydrocarbons, B is a group Va, VIa, or VIIa element, n is an integer from 2 to 4, and A is an inorganic anion, for example, sulfate, borate, perchlorate, nitrate, thiocyanate, and the halogens such as iodide, chloride, and bromide. R can contain copolymerizable ethylenically unsaturated groups such as acrylate or methacrylate (e.g., AGEFLEX™ quaternary ammonium acrylates, available from CPC Chemical, Old Bridge, N.J.).

Preferred onium salts include tetraoctylammonium chloride, tetrabutylammonium bromide, tetrabutyl ammoniumthiocyanate, tetrabutylphosphoniumbromide, and the like.

Blends of two or more suitable conductivity enhancers can be used if desired.

Dissociation Enhancing Agent

The dissociation of the ion pairs may also be enhanced by the addition of one or more dissociation enhancing agents. These dissociation enhancing agents will associate with (i.e., "stabilize") one or both of the ions of the conductivity enhancer. As with each component, the dissociation enhancing agents when added preferably should meet the "solvent-free" requirements and preferably do not interfere with the polymerization. Typically, when present in the composition, at least 0.1 parts by weight, based on 100 parts by weight monomer(s) and polydiorganosiloxane polymer(s), are added, preferably, about 0.5 to about 5 parts by weight based on 100 parts by weight monomer(s) and polydiorganosiloxane polymer(s) are added. Preferred dissociation enhancing agents have a dielectric constant of at least 5° at 20° C. More preferably the dielectric constant is at least 10° at 20° C. and most preferably at least 20° at 20° C. Examples are well known in the art and include materials such as polyethylene glycols, glycerols, propylene carbonates, poly(ethylene oxides), and dialkyl ureas. Small amounts of co-reactive and more polar monomers can also be used to enhance dissociation, provided they do not adversely affect the properties of the cured coatings. Examples of such monomers include, but are not limited to, N-vinyl pyrrolidone, N,N-dimethyl acrylamide, methacrylic acid, 2-ethoxyethyl acrylate, CARBOWAX™ 750 acrylate (Union Carbide, Danbury, Conn.), and the like.

Monomers

The monomers selected for these compositions are essentially completely miscible with the other components of the mixture. In addition, these monomers have sufficiently low vapor pressures so that little material loss occurs during processing. Preferably, the monomers are non-volatile, or are such that their vapor pressures are 1 kPa or less at 25° C. More preferably their vapor pressures are less than 0.5 kPa at 25° C., and most preferably less than 0.1 kPa at 25° C. Useful monomers include both monofunctional and multifunctional vinyl monomers.

Typical free-radically curable monofunctional monomers include vinyl monomers which can serve as reactive diluents for the polydiorganosiloxane polymers. Suitable vinyl monomers include, but are not limited to, styrene, butyl acrylate, hexyl acrylate, benzyl acrylate, cyclohexyl acrylate, isobornyl acrylate, isooctyl acrylate, isononyl acrylate, isodecyl acrylate, lauryl acrylate, 2-ethylhexyl acrylate, octadecyl acrylate, butyl methacrylate, isobornyl methacrylate, isooctyl methacrylate, tetrahydrofurfuryl acrylate, vinyl pivalate, vinyl 2-ethylhexanoate, and mixtures thereof. Such monomers are known in the art, and many are commercially available.

Preferred monofunctional vinyl monomers mixtures contain predominantly (i.e., about 50 to about 100 mole percent) acrylic monomer due to their rapid cure rate. Most preferred monomers comprise acrylic monomers selected from the group consisting of acrylic acid esters of non-tertiary alcohols comprising from about six to about twelve carbon atoms, such as those selected from the group consisting of cyclohexyl acrylate, isobornyl acrylate, isooctyl acrylate, 2-ethylhexyl acrylate, lauryl acrylate, and mixtures thereof, due to their good solvating ability, high reactivity, and low volatility.

Multifunctional free-radically polymerizable vinyl monomers include, but are not limited to, divinyl benzenes, and acrylates, methacrylates, and betaacryloxypropionates of alkyl polyols such as 1,6-hexanediol, trimethylolpropane, 1,4-butanediol, tri- and tetraethylene glycol, pentaerythritol, their ethoxylated and propoxylated analogs, and mixtures thereof. Such monomers are included in the composition to ensure rapid cure rates and a tightly crosslinked coating. Preferred multifunctional monomers include acrylates of 1,6-hexanediol, trimethylolpropane, their ethoxylated and propoxylated analogs, and mixtures thereof Blends of one or more suitable monomers can be used if desired.

Initiators

The free-radical polymerization of these compositions should be carried out in as oxygen-free an environment as possible, e.g., in an inert atmosphere such as nitrogen gas. Generally, the initiator comprises from about 0.1 to about 5 parts by weight based on 100 parts by weight of monomer(s) and polydiorganosiloxane polymer(s). Polymerization may also be initiated with high energy irradiation, such as electron beam or gamma rays. These high energy irradiation systems do not always require initiators.

Light (ultraviolet or visible) may be used to initiate polymerization. Photoinitiators include materials which undergo fragmentation upon irradiation, hydrogen abstraction type initiators, and donor-acceptor complexes. Suitable photofragmentation initiators include, but are not limited to, those selected from the group consisting of benzoin ethers, acetophenone derivatives such as 2,2-dimethoxy- 2-phenyl acetophenone, 2-hydroxy-2-methyl-1-phenylpropan- 1 -one, 2,2,2-trichloroacetophenone and the like. Suitable hydrogen abstraction type initiators include benzophenone and derivatives thereof, anthraquinone, 4,4'-bis(dimethylamino) benzophenone (Michler's ketone) and the like. Suitable donor-acceptor complexes include combinations of donors such as triethanolamine with acceptors such as benzophenone. Also suitable are sensitizers with initiators such as thioxanthone with quinoline sulfonylchloride.

Thermal energy also can be used to initiate polymerization. Thermal initiators may be selected from the conventional peroxide or azo type materials commonly available. Illustrative examples include benzoylperoxide, 2,2'-azo-bis (isobutyronitrile), 1, '-azo-bis(cyclohexane- 1 -carbonitrile), dicumylperoxide and the like. Redox initiators, such as amines with peroxides, cobaltous carboxylate salts with peroxides, or persulfate/bisulfite redox pairs, may also be used provided the initiators are completely soluble in the monomer mixtures and do not prematurely initiate the reaction interfering with the coating process by slowly increasing the viscosity of the solution. If needed, the initiator can first be applied to the substrate by any conventional means.

Polydiorganosiloxane Polymers

In general, the silicone release component is a polydiorganosiloxane polymer which is known to have release characteristics. Generally, these polymers are themselves crosslinkable and have crosslinkable groups such as ethylenically unsaturated groups, e.g., acrylates, methacrylates, acrylamides, methacrylamides, α-methyl styrene, and vinyls.

Suitable polydiorganosiloxane polymers include those selected from the group consisting of polymers falling within the general formula:

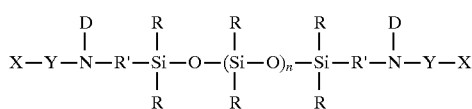

and mixtures thereof, wherein:

X are monovalent moieties having ethylenic unsaturation which can be the same or different;

Y are divalent linking groups which can be the same or different;

D are monovalent moieties which can be the same or different selected from the group consisting of hydrogen, an alkyl group of 1 to about 10 carbon atoms, and aryl;

each R is a monovalent moiety independently selected from alkyl moieties preferably having about 1 to 12 carbon atoms and which may be substituted with, for example, trifluoroalkyl or vinyl groups, cycloalkyl moieties preferably having about 6 to 12 carbon atoms and which may be substituted with alkyl, fluoroalkyl, and vinyl groups, aryl moieties preferably having about 6 to 20 carbon atoms and which may be substituted with, for example, alkyl, cycloalkyl, fluoroalkyl and vinyl groups, preferably at least 50 percent of the R moieties are methyl radicals with the balance being monovalent alkyl or substituted alkyl radicals having 1 to 12 carbon atoms, vinylene radicals, phenyl radicals, or substituted phenyl radicals;

R' are divalent hydrocarbon groups which can be the same or different; and n is an integer of about 25 to about 750.

For example, copolymerizable polydimethylsiloxanes, such as ACMAS (acrylamidoamido siloxane) and MAUS (methacryloxyurea siloxane) as disclosed in EPO Appln No. 92.907947.3 (Mazurek et al.) can be are added to the composition to obtain release properties.

Other suitable polydiorganosiloxane polymers are described in U.S. Pat. No. 4,908,274 (Jachmann et al.), commercially available by Goldschmidt Chemical Co., for example as TEGO™ RC-706 and TEGO™ RC-726. U.S. Pat. No. 4,908,274 discloses polysiloxanes with (meth) acrylate ester groups linked over SiC groups which are obtainable by the reaction of epoxy-functional polysiloxanes of the general formula

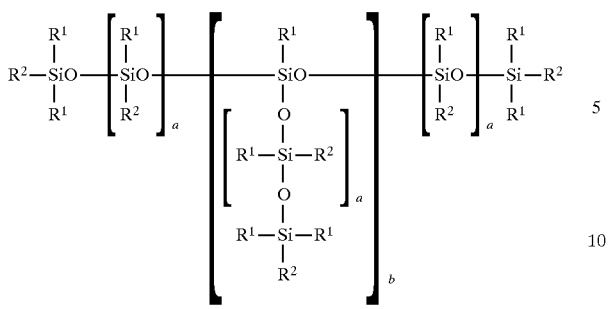

in which
R$^1$ are the same or different low molecular weight alkyl groups with 1 to 4 carbon atoms or phenyl groups,
R$^2$ is the same as R$^1$ or represents the R$^3$ group, 70 to 100% of the R$^3$ groups being epoxy functional groups and 30 to 0% being alkyl groups with 2 to 20 carbon atoms or hydrogen, with the proviso that the average molecule contains at least 1.5 epoxy groups,
a is an integer having a value of 1 to 1,000 and
b is an integer having a value of 0 to 10, with such amounts of an acid mixture, consisting of
(a) 10 to 90 mole percent of (meth)acrylic anhydride, and
(b) 90 to 10 mole percent of (meth)acrylic acid that the sum of (a) and (b) adds up to 100 mole percent, and that there are present 0.8 to 1.9 acid equivalents per epoxide equivalents.

Other suitable polydiorganosiloxanes include polydiorganosiloxane oligourea segmented copolymer compositions of the general formula

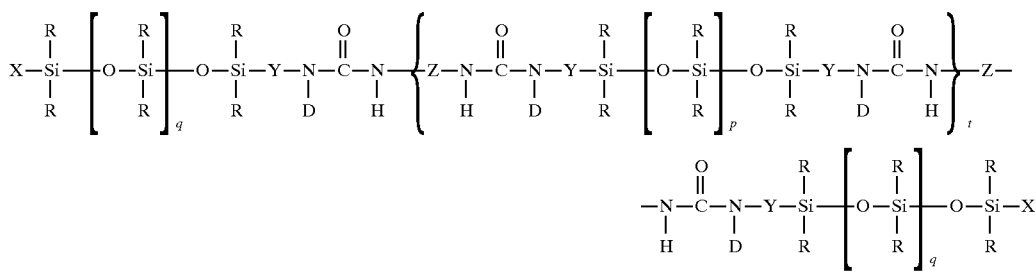

wherein
each Z is a divalent radical selected from arylene radicals and aralkylene radicals preferably having from about 6 to 20 carbon atoms, alkylene and cycloalkylene radicals preferably having from about 6 to 20 carbon atoms, preferably Z is 2,6-tolylene, 4,4'-methylenediphenylene, 2,2'-dimethoxy-4,4'-diphenylene, tetramethyl-m-xylylene, 4,4'-methylenedicyclohexylene, 3,5,5-trimethyl-3-methylenecyclohexylene, 1,6-hexamethylene, 1,4-cyclohexylene;
each R is a monovalent moiety independently selected from alkyl moieties preferably having about 1 to 12 carbon atoms and which may be substituted with, for example, trifluoroalkyl or vinyl groups, cycloalkyl moieties preferably having about 6 to 12 carbon atoms and which may be substituted with alkyl, fluoroalkyl, and vinyl groups, aryl moieties preferably having about 6 to 20 carbon atoms and which may be substituted with, for example, alkyl, cycloalkyl, fluoroalkyl and vinyl groups, preferably at least 50 percent of the R moieties are methyl radicals with the balance being monovalent alkyl or substituted alkyl radicals having 1 to 12 carbon atoms, vinylene radicals, phenyl radicals, or substituted phenyl radicals;

each Y is a divalent moiety independently selected from alkylene radicals preferably having 1 to 10 carbon atoms, aralkylene radicals and arylene radicals;

each D is a monovalent radical independently selected from hydrogen, alkyl radicals preferably having 1 to 10 carbon atoms, aryl or arylalkyl radicals preferably having about 6 to 20 carbon atoms; an p is a number which is about 10 or larger, preferably about 15 to 2000, more preferably about 30 to 1500;

q is a number which is about 10 or larger, preferably about 15 to 2000, more preferably about 30 to 1500;

t is a number which is 0 to about 8; and each X is independently
(a) a moiety represented by

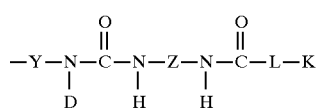

where each of Z, Y, and D are defined as above,

L is independently $-\underset{\underset{D}{|}}{N}-$, $-O-$, $-S-$,

K is a free radically curable end group such as, for example, acrylate, methacrylate, acrylamido, methacrylamido, α-methyl-styrene, and vinyl groups; or
(b) a moiety represented by

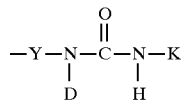

wherein D, Y, and K are defined as above.

The polydiorganosiloxane polymers preferably do not detrimentally interfere with the conductivity and sprayability of the monomer mixture.

The release coating composition of the present invention may be prepared by combining (a) about 100 parts by weight of one or more vinyl monomer(s), and (b) from about 0.05 to about 250 parts by weight, preferably from about 0.05 to about 200 parts by weight, and more preferably from about 0.05 to about 100 parts by weight, of one or more polydiorganosiloxane polymer(s). From about 0.10 to about 10 parts by weight based on 100 parts by weight of (a) and (b), preferably from about 0.5 parts by weight to about 5 parts by weight, based on 100 parts by weight of (a) and (b), of one or more conductivity enhancer(s). The composition may further comprise from about 0.1 to about 5 parts by weight based on 100 parts by weight of (a) and (b), of one or more free-radical initiators, and optionally, at least 0.1 part by weight based on 100 parts by weight of (a) and (b) of one or more dissociation enhancing agent(s), may be added to provide sufficient conductivity for electrospraying yielding an application composition. This application composition may be electrosprayed onto a substrate and then polymerized.

The vinyl monomer(s) may be a mixture of both monofunctional and multifunctional vinyl monomers. The monofunctional vinyl monomer(s) typically range from about 40 to about 95 parts per 100 parts vinyl monomer, preferably from about 50 to about 90 parts, and most preferably from about 60 to about 90 parts. The multifunctional vinyl monomer(s) typically range from about 5 to about 60 parts per 100 parts vinyl monomer, preferably from about 10 to about 50 parts, and most preferably from about 10 to about 40 parts. Preferred multifunctional vinyl monomers have 2 to 6 functional groups. Most preferred multifunctional monomers have 2 to 3 functional groups.

Additives such as flatting agents, dyes, plasticizers, tackifiers and the like can be used or non-functional flow enhancers and wetting agents can be added to improve the aesthetics of the coating. These additives must be soluble in the sprayable solutions, are nonvolatile, and preferably do not detrimentally interfere with the conductivity, the polymerization, or the final properties of the compositions.

The composition may be electrosprayed on a substrate and then polymerized by exposure to electron beam, gamma ray, visible light, ultraviolet radiation, or heat. Typically, the substrate has two major surfaces, and the release coating composition is applied to at least a portion of at least one major surface.

One embodiment of the present invention is a substrate comprising a backing having first and second sides, an adhesive layer having two sides, one side coated onto the first side of the backing, and a release layer on the second side of the backing comprising the polymerized release coating composition. Preferably the release coating composition is electrosprayed onto the second side of the backing. When the release coating is used on pavement marking tapes, and other such rolled substrates, the substrate is rolled such that the first side of the backing (if already adhesive coated, the adhesive layer) contacts the release layer.

Suitable substrates include, but are not limited to, a sheet, a fiber, or a shaped object. The preferred substrates are those used for pressure-sensitive adhesive products. The composition may be applied to at least one major surface of suitable flexible or inflexible backing materials and then cured. Useful flexible backing materials include plastic films such as poly(propylene), poly(ethylene), poly(vinyl chloride), poly(tetrafluoroethylene), polyester (e.g., poly(ethylene terephthalate)), polyimide film such as DuPont's KAPTON™, cellulose acetate, and ethyl cellulose, although any surface requiring release toward adhesives may be chosen. Backings may also be constructions with irregular surfaces such as woven fabric, nonwoven fabric, paper, or rough surfaces. Backings can thus also be of woven fabric formed of threads of synthetic or natural materials such as cotton, nylon, rayon, glass, or ceramic material, or they can be of nonwoven fabric such as air-laid webs of natural or synthetic fibers or blends of these, provided they are not too porous. Due to its high porosity, paper itself is usually not suitable, unless heavier coatings are applied to offset soaking into the paper. However, plastic coated or impregnated paper is useful. Rough surfaces include embossed or patterned surfaces or particle impregnated resins such as abrasive particle covered (epoxy) resin and glass bead covered resins. In addition, suitable substrates can be formed of metal, metallized polymeric film, ceramic sheet material, natural or synthetic rubber, or pavement marking tapes.

EXAMPLES

The following examples illustrate various specific features, advantages, and other details of the invention. The particular materials and amounts recited in these examples, as well as other conditions and details, should not be construed in a manner that would unduly limit the scope of this invention.

Unless otherwise indicated, the following test methods are used in the Examples.

Solubility test

The solubility of the conductivity enhancer for each composition was determined by the following method. A sample of the conductivity enhancer was mixed with a clear monomer solution at room temperature for a maximum of two hours and then checked under agitation for optical clarity. If the conductivity enhancer containing sample was not totally clear or a "true solution", the sample was moderately heated (such that the sample could be held by hand) and then allowed to cool to room temperature. A sample which contained visible conductivity enhancer particles was deemed to have failed.

Viscosity Measurement

The Brookfield viscosity (in centipoise (cp), 1 cp=1 mPa·s) was measured at room temperature with a Brookfield digital viscometer model DV-II available from Brookfield Engineering Laboratories, Inc., Stoughton, Mass.

Conductivity Measurements

The electrical conductivity of a solution was measured by inserting a simple cell composed of two parallel stainless steel rods acting as electrodes into a glass jar containing the solution. The rods, each about 9 cm long and about 3 mm in diameter, were separated by 1 cm center-to-center spacing and were maintained parallel by having both rods embedded at one end into a piece of insulated material (either a standard rubber bottle stopper or a piece of GAROLITE™ available from McMaster-Carr, Chicago, Ill.) The height H was the height of the solution meniscus relative to the bottom of the rods. When the rods were placed in a solution at height H, and an electrical potential was applied across the rods, an electrical current attempted to flow between the rods. The solution, air, and insulator provided a net resistance R to the electrical current flow. When the rods were placed to height H in a solution that was reasonably more conductive than air, then the effective resistance was that of the solution. For example, the conductivity of air is approximately $10^{-12}$ S/m or $10^{-6}$ $\mu$S/m, and the conductivity of insulators are even lower, thus for a solution having a conductivity greater than 0.001 $\mu$S/m the resistance R, to within 0.1 percent, was effectively due only to the solution. Resistance R is directly proportional to a geometry factor G and is inversely proportional to the electrical conductivity a, and thus G=Rσ. G depends on the height H as well as other fixed parameters such as the separation-distance of the rods and the diameter of the rods. If these fixed parameters are defined as a second geometry factor g then, g=GH where g is a constant defined by the specific geometry of the electrode structure. The value of g was determined using a solution having a known conductivity $\sigma_o$ which gives a resistance $R_o$ when the rods are placed to some specific height $H_o$ in the solution. Because $\sigma_o$ was known and $R_o$ was measured, the geometry factor $G_o$ was determined from $G_o = R_o \sigma_o$. Knowing $H_o$, g was determined using $g = G_o H_o$. Because g is a constant, $g = G_o H_o = GH$, and because g is known, G can be determined for any rod-electrode immersion depth H.

To calibrate the rod-electrode cell, the cell constant g was determined using several salt solutions of known conductivity (Standard Reference Materials (1500, 10000 and 50000 $\mu$S/m), available from National Institute of Standards and Technology (NIST), Gaithersburg, Md.). The constant g varied from about 60 cm/m at 1500 $\mu$S/m to a value of about 70 cm/m at 50,000 $\mu$m. When an impedance analyzer was used to measure the dielectric constant of methanol, isopropyl alcohol (IPA) and methyl ethyl ketone (MEK), g had to be adjusted to obtain the dielectric constant values noted in the Handbook of Chemistry and Physics (CRC Press, Inc., Boca Raton, Fla.). When these g values were plotted against the natural logarithm of the measured conductivity for IPA, MEK, and methanol, and the g values determined using the NIST solutions were also plotted against the natural logarithm of the NIST solution values, all g values fell on the same straight line. As a result, g=59.45 cm/m was chosen which gave the exact conductivity at 1000 $\mu$S/m. With this value of g, all reported conductivity data deviated by about 10 percent per conductivity decade away from 1000 $\mu$S/m, being lower for conductivity below 1000 $\mu$S/m and higher for conductivity above 1000 $\mu$S/m. For example, a conductivity reported as 100 $\mu$S/m was actually about 10 percent lower, one reported as 10 $\mu$S/m is actually about 20 percent lower, etc. Using g=59.45 cm/m, the conductivity σ was determined from the resistance across the cell by the formula σ=g/(HR), where R is the resistance of the solution when the cell was inserted in the solution to height H.

Three methods were used to determine the resistance R and hence the conductivity σ of the solution.

In Method I, a Hewlett Packard LF (Low Frequency) Impedance Analyzer Model 4192A (Hewlett Packard Company, Palo Alto, Calif.) was connected across the cell and the admittance Y and the angle D were recorded at frequencies F of 100, 300, 500, 700, 900, and 1000 kilohertz (kHz) along with the immersion depth H of the rods in the solution. This information was used to calculate the conductivity by the formula σ=(gYcosD)/H. For Method I, the dielectric constant $\epsilon_r$ of the solution may also be computed by the formula $\epsilon_r = (gYsinD)/(2\pi \epsilon_o FH)$ where $\epsilon_o$ is the permittivity of free space (8.85×10$^{-12}$ farads per meter (F/m)).

In Method II, a BK Precision Model 878 Universal LCR Meter (BK Precision, Maxtec International Corporation, Chicago, Ill.) was connected across the cell and the resistance R at a frequency F of 1 kHz was measured along with the immersion depth H of the rods in the solution. The conductivity was then computed by the formula σ=g/(HR).

In Method III, the cell was connected in series with a resistor $R_s$ of 1 MΩ, a micro-ammeter A and a switch S. This series circuit was then connected across a standard 9-volt dry cell battery. After the cell was immersed to a height H in the solution the switch S was momentarily closed and the initial reading $I_s$ on the ammeter was recorded. Along with $I_s$, the immersion depth H of the electrodes was recorded. In Method III, the battery voltage $V_b$ may be connected across a switch placed in series with the ammeter and a calibration resistor $R_c$ of 1 MΩ. When this switch was closed the measured current $I_c$ times the resistance $R_c$ gave the voltage of the battery. This information was then used to calculate the conductivity of the solution by the formula $$\sigma = g/H \left( \frac{[I_c R_c]}{I_c} - R_s \right).$$

The following materials were used in the Examples:

Table of Components

| Component | Source |
|---|---|
| 2,2'-azobis(isobutyronitrile) (VAZO ™ 64) | DuPont, Wilmington, DE |
| 1,4-butanediol diacrylate (BDA) | SR 213, Sartomer Company, West Chester, PA |
| 1,6-hexanediol diacrylate (1,6-HDDA) | SR 238, Sartomer Company, West Chester, PA |
| 2-hydroxyethyl acrylate | Dow Chemical, Midland, MI |
| 2-sulfoethyl methacrylate (SEMA) | Eastman Chemical, Kingsport, TN |
| α,ω-ACrylaMidoAmido Siloxane (5K ACMAS) | EPO Appln No. 92.907947.3 (Mazurek et al) |
| acrylic acid | BASF Corp., Charlotte, NC |
| DAROCUR ™ 1173 | Ciba-Geigy Corporation, Ardsley, NY |
| GE 9380 | GE Silicones, Waterford, NY |
| isooctyl acrylate (IOA) | SR 440, Sartomer Company, West Chester, PA |
| methacrylic acid (MAA) | BASF Corp., Charlotte, NC |
| α,ω-MethAcryloxyUrea Siloxane (5K MAUS) | EPO Appln No. 92.907947.3 (Mazurek et al.) |
| methyl (trialkyl ($C_8$–$C_{10}$) ammonium bromide (Adogen ™ 464) | Aldrich Chemical Co., Milwaukee, WI |
| methyl (tricaprylyl) ammonium bromide (ALIQUAT ™ 336) | Henkel Corporation, Kankakee, IL |
| N,N-dimethyl acrylamide (NNDMA) | Jarchem Industries, Inc., Newark, NJ |
| N,N-dimethylamino ethylacrylate (DMAEA) | CPS Chemical Company, Old Bridge, NJ |
| N,N-dimethylamino ethylmethacrylate (DMAEMA) | CPS Chemical Company, Old Bridge, NJ |
| N-vinyl pyrrolidone | BASF Corp., Charlotte, NC |
| Tego RC726 (100% solids polydiorganosiloxane) | Goldschmidt AG, Essen, Germany |
| tetrahydrofurfuryl acrylate (THFA) | SR 285, Sartomer Company, West Chester, PA |
| tridecylacrylate (TDA) | SR 489, Sartomer Company, West Chester, PA |
| tri(n-octyl)amine (TOA) | Aldrich Chemical Company, Milwaukee, WI |

Synthesis of 5K MAUS and 5K ACMAS

These free-radically curable polydimethylsiloxanes (PDMS) are made according to the procedure outlined in EPO Appln No. 92.907947.3 (Mazurek et al.).

A 5,000 molecular weight α,ω-bis(3-aminopropyl) PDMS (EPO Appln. No. 93.924905.8 (Leir et al.)) is reacted in bulk with either 2-isocyanotoethyl methacrylate to yield 5K MAUS, or vinyldimethylazlactone (prepared as in U.S. Pat. No. 4,777,276, Rasmussen et al.) to yield 5K ACMAS. Stepwise addition of the capping agent to the PDMS with some cooling is desirable to avoid polymerization of the free-radically curable PDMS product.

Example 1

A master batch was prepared by mixing 60 gram quantities of 75/25 IOA/,1,6-HDDA monomer mixtures with the following additives, as detailed in the following table. Upon standing, Sample 11 exhibited phase separation. Comparative Sample A, i.e., the master batch material with no additives, had zero conductivity. The conductivity was then measured as described in Method III with the samples at a height H=5 cm.

| Sample | Additives (g) | Current ($\mu$Amp) | Conductivity ($\mu$S/m) |
| --- | --- | --- | --- |
| 1 | 0.25 Adogen 464<br>1.50 THFA | 1.67 | 2.60 |
| 2 | 1.62 MAA<br>2.40 DMAEA<br>3.0 NNDMA | 1.28 | 1.90 |
| 3 | 1.0 MAA<br>4.11 TOA<br>3.0 NNDMA | 1.36 | 2.04 |
| 4 | 2.0 MAA<br>8.22 TOA<br>3.0 NNDMA | 2.45 | 4.26 |
| 5 | 0.25 Adogen 464<br>0.6 NNDMA<br>9.0 5K ACMAS<br>1.2 Darocur 1173 | 7.8 | 62.8 |
| 6 | 0.25 Aliquat 336<br>0.6 NNDMA<br>9.0 5K ACMAS<br>1.2 Darocur 1173 | 6.6 | 29.3 |
| 7 | 0.5 Adogen 464 | 2.38 | 4.09 |
| 8 | 0.5 Adogen 464<br>3.0 NNDMA | 6.4 | 26.4 |
| 9 | 0.25 Adogen 464<br>1.5 NNDMA | 3.4 | 6.68 |
| 10 | 0.25 Adogen 464<br>3.0 NNDMA | 5.4 | 16.5 |
| 11 | 1.0 DMAEMA<br>2.25 SEMA<br>3.0 NNDMA | 8.2 | 90.7 |
| A | none | 0 | 0 |

Example 2

A release coating composition (i.e., sample I) was prepared by mixing at room temperature 100 parts of a 75/25 monomer mixture of IOA/1,6-HDDA, 25 parts of 5K MAUS, 2 parts Darocur 1173, 0.5 parts Aliquat 336 and 1 part NNDMA. A clear homogeneous solution was obtained. No particular mixing order is-necessary to obtain conductivity although preferentially the high viscosity components are added in the listed order.

Using Method II, a resistance of 326 k$\Omega$ was measured at H=4 cm with the LCR meter giving a conductivity of 45.6 $\mu$S/m.

As a comparative, the release coating composition described in sample I was prepared without Aliquat 336 and NNDMA. The current was measured as described in Method III and found to be zero (conductivity also zero). This composition did not meet the conductivity requirements for electrospray without a conductivity enhancer and dissociation agent.

Example 3

A release coating composition was prepared by mixing at room temperature 100 parts of 75/25 IOA/1,6-HDDA, 25 pph Tego RC726, and 2 pph Darocur 1173. The resistance was in excess of the 10 M$\Omega$ instrument limit of the LCR meter indicating the conductivity was less than 1.5 $\mu$S/m (measured according to Method II). To make this composition more conductive, 2 pph NNDMA and 1.5 pph Aliquat 336 were added. The resulting composition was clear and at a height H=4 cm the resistance dropped to 606 k$\Omega$ (24.5 $\mu$S/m conductivity), giving a composition within the most preferred range for electrospray.

Example 4

This example demonstrates a heat-curable composition with enhanced conductivity upon addition of an onium salt and dissociation enhancing agent.

A release coating composition was prepared by mixing at room temperature 100 parts of 75/25 IOA/1,6-HDDA, 25 pph Tego RC726, and 2 pph VAZO 64 and a conductivity less than 1.5 $\mu$S/m was measured according to Method II. Upon addition of 1.5 pph Aliquat 336, the resistance at a height H=4 cm dropped to 3.12 M$\Omega$ (4.8 $\mu$S/m conductivity). With the addition of 3 pph of NNDMA, the resistance further dropped to 731 k$\Omega$ (20.3 $\mu$S/m conductivity) which was within the most preferred range for electrospray.

Example 5

A release coating composition was prepared by mixing together the following by simple agitation in ajar at room temperature: 100 parts of 70/30 IOA/1,6-HDDA, 5 pph 5K ACMAS, 2 pph Darocur 1173, 1 pph N-vinyl pyrrolidone, and 0.5 pph Aliquat 336. The mixture was clear and at a height H=4 cm had a resistance of 616 k$\Omega$ (24.1 $\mu$S/m conductivity) measured according to Method II.

Example 6

The composition described in Example 5 was prepared, substituting IOA/1,6-HDDA in a ratio of 60/40. The 4-cm height resistance was 557 k$\Omega$ (26.7 $\mu$S/m conductivity) measured according to Method II.

Example 7

A release coating composition comprising 100 parts of 75/25 TDA/BDA monomer mixture, 25 pph 5K MAUS, 2 pph Darocur 1173, 1 pph NNDMA, and 0.5 pph Aliquat 336 was prepared by agitating the components in ajar at room temperature. The 4-cm height resistance was 632 k$\Omega$ (23.5 $\mu$S/m conductivity) measured according to Method II.

Example 8

This example demonstrates electrospraying the release coating having ampholytic acid-base pairs onto pavement marking tapes.

A release coating composition was prepared by mixing together the following:

| | |
| --- | --- |
| 450 g | IOA |
| 150 g | 1,6-HDDA |
| 60 g | 5K ACMAS |
| 12 g | Darocur 1173 |
| 30 g | NNDMA |
| 8.6 g | MAA |
| 12 g | DMAEA. |

The release coating composition was electrosprayed onto the indicated pavement marking tapes available from Minnesota Mining and Manufacturing Co. (3M), St. Paul, Minn., using a process similar to that disclosed in U.S. Pat. No. 5,326,598 (Seaver et al.) incorporated by reference herein, and U.S. Ser. No. 08/392,108 (Seaver et al.).

About 0.3 liters of the release coating composition was placed in a small glass jar and drawn out by a pump (MASTERFLEX™ pump drive Model 7520-25, MICROPUMP™ Model 07002-26 pump head both available from Cole-Parmer Instrument Co., Chicago, Ill.) to the sprayhead.

The electrospray coating head die consisted of two plastic die halves which when placed together maintained a 0.508 mm exit slot height along the bottom of the die. Recessed in the slot and compressed to 1.53 mm was a Porex Model X-4920 porous plastic sheet (Porex Technologies, Fairburn, Ga.) to maintain a reasonable pressure drop and allow uniform flow. A wire was suspended beneath the slot and extractor rods suspended parallel to the wire in approximately the same horizontal plane. The slot had a width of 0.318 m and the die end caps added another 0.0127 m, creating a 0.33 m segment of the wire wetted by the coating solution. This 0.33 m width was used in a mass balance equation to calculate the flow rate required to obtain a desired coat height at any defined web speed. The wire had a diameter of 1.59 mm and was positioned 0.889 mm from the slot. The extractor rods each had a diameter of 6.35 mm and were positioned on either side of the wire 11.1 mm above the wire and 0.12 m above the earth grounded metal coating drum (0.508 m diameter and 0.61 m width).

Samples of the pavement marking tape (each about 0.33 m by about 0.91 m) were attached to 36 μm thick polyester carrier web (available from 3M) by box sealing tape available from 3M. The web speed was held fixed at the rates listed below for each corresponding sample and the pump was adjusted to produce the listed coat height or coating thickness.

During coating the web was charged on the coating drum using a corotron consisting of a half-moon-shaped earth grounded conductor made from a 72 mm diameter ID aluminum pipe and a 60 micrometer diameter wire attached to a positive power supply (Model PS/WG-10P30-DM, available from Glassman High Voltage, Inc., Whitehouse Station, N.J.)). The corotron voltage was adjusted to always charge the polyester carrier web to a 1000 volt potential relative to the grounded coating drum.

A negative 30 kV Glassman power supply Model PS/WG-50N6-DM (Glassman High Voltage, Inc.) was connected from ground to the sprayhead wire. The extractor electrodes were held at ground potential.

When a coating flow was present and the high voltage was applied, liquid filaments formed over the wetted 0.33 m length of the wire beneath the slot. The Rayleigh jet instability caused the breadup of the filaments creating a mist of negatively charged droplets which were attracted to the positively charged carrier web.

Subsequent to coating, the samples were UV cured in a UV processor (available from GEO AETEK International, Plainfield, Ill.) consisting of two medium pressure mercury vapor UV lights within a gas purging chamber which was inerted with nitrogen gas. Each light could be set at power setting of 125, 200, 300, and 400 watts per inch (4.92, 7.87, 11.8, and 31.4 kW/m).

The pavement marking tapes were coated with the release coating to a range of heights (thickness) as described below. As shown, with the addition of a conductivity enhancer, different pavement marking tapes can be electrosprayed at different coat heights and web speeds.

| Sample | Pavement Marking Tape | Web Speed (fpm) | UV Power (W/in) | Coat Height (micrometers) |
|---|---|---|---|---|
| 1 | 380 STAMARK ™ | 30 (9.14 m/min) | 200 (7.87 kW/m) | 1, 2, 4 |
| 2 | 420 STAMARK ™ | 25 (7.62 m/min) | 200 (7.87 kW/m) | 1, 2, 4 |
| 3 | 331 STAMARK ™ | 50 (15.24 m/min) | 200 (7.87 kW/m) | 1, 2, 4 |
| 4 | 620 SCOTCHLANE ™ | 90 (27.43 m/min) | 400 (15.74 kW/m) | 1, 2, 2.8 |

Example 9

This example demonstrates electrospraying a release coating having an onium salt onto pavement marking tapes.

A release coating composition was prepared by mixing together the following:

100 parts 75/25 IOA/1,6-HDDA
25 parts 5K MAUS
0.42 part Aliquat 336
1 part NNDMA
2 parts Darocur 1 173

The release coating was electrosprayed onto the following pavement marking tapes available from 3M as described in Example 8:

| Sample | Pavement Marking Tape | Web Speed (fpm) | Coating Height (micrometers) |
|---|---|---|---|
| 1 | 380 STAMARK | 30 (9.14 m/min) | 1, 2, 4 |
| 2 | 420 STAMARK | 25 (7.62 m/min) | 1, 2, 4 |
| 3 | 331 STAMARK | 90 (27.43 m/min) | 1 |
| 4 | 5730 STAMARK | 90 (27.43 m/min) | 1, 2, 2.8 |

Example 10

Pavement marking tapes were electrosprayed with a release coating and measurements were taken of the silicone transfer.

A release coating composition was prepared by mixing the following components at room temperature in a suitable vessel:

| 1800 g | IOA |
| 600 g | 1,6-HDDA |
| 24 g | NNDMA |
| 12 g | Aliquat 336 |
| 600 g | 5K MAUS |
| 48 g | Darocur 1173 |

The release coating was applied to the pavement marking tapes listed below by electrospray. The electrospray coating and UV curing assembly used was as described in Example 8 except the assembly was capable of handling 1.27 m±0.05 m wide continuous webs.

In order to measure silicone transfer, the following procedure was followed: a polybutadiene resin-based pressure sensitive adhesive was coated directly onto sputter etched polyester (4 mil (101.6 μm) film available from 3M). A strip of this adhesive coated polyester was applied to the release coated side of each of the samples. The samples were then placed under a 5 lb (2.27 kg) mass for three days in order to facilitate transfer. A glass panel was placed on top of each sample in order to evenly distribute the weight over an equal area, 4-inch×6-inch (102 mm×152 mm). The adhesive was removed from the surfaces just prior to loading into the spectrometer (Model 5100, available from Physical Electronics, Eden Prairie, Minn.). Silicone transfer was measured using X-ray Photoelectron Spectroscopy (XPS).

XPS survey spectra of the adhesive surface indicate that all samples contain silicon. Angle resolved XPS at 45° and 90° was used to estimate the silicon levels at the surface and near surface regions. The measured atomic concentrations are listed in the table below. Prior to exposure to the electrospray release coating, the adhesive had not been exposed to any silicon sources. Therefore, all of the silicon detected on the surface of the adhesive after exposure can be attributed to transfer from the electrospray release coating.

| Sample | Angle | Pavement Marking Tape Description | Silicon level (atomic %) |
|---|---|---|---|
| 1 | 45 | 420 tape coated with | 4.4 |
|   | 90 | 1 micron of release coating | 3.3 |
| 2 | 45 | 621 tape coated with | 1.3 |
|   | 90 | 0.25 micron of release coating | 1.0 |
| 3 | 45 | 380 tape coated with | 6.7 |
|   | 90 | 1 micron of release coating | 5.7 |
| 4 | 45 | 331 tape coated with | 2.1 |
|   | 90 | 1 micron of release coating | 1.6 |
| 5 | 45 | 620 tape coated with | 2.5 |
|   | 90 | 0.25 micron of release coating | 1.7 |

For pure polydimethylsiloxane, the atomic percent of silicon is about 25, thus the silicone transfer from the electrospray release coating is minimal.

Example 11

This example (parts (a) and (b)) demonstrates the effectiveness of a dissociation enhancing agent.

A composition was prepared by mixing the following in a suitable vessel at room temperature:
20 g 75/25 IOA/1,6-HDDA with 5 wt % 5K ACMAS
0.72 g acrylic acid
1.13 g DMAEA The conductivity of the composition was determined as described in Method I. The conductivity was 1.2 μS/m.

The following samples were then prepared.
a) 5 parts of 2-hydroxy ethylacrylate was added to 100 parts of the original composition. The conductivity was measured and found to be 3.5 μS/m
b) 5 parts of NNDMA was added to 100 parts of the original composition. The conductivity was measured and found to be 4.0 μS/m.

Two parts Darocur 1173 was added to sample (b) and the sample was then electrosprayed onto a 380 STAMARK™ pavement marking tape available from 3M.

The composition was electrosprayed as described in Example 8, with a web speed of 30 fpm (9.14 m/min) and applied to the marking tape at a range of coat heights.

The composition was then UV cured under inert atmosphere. Using the silicone transfer test described in Example 10, atomic concentrations of silicon were measured at a 45° angle. The results are detailed in the following table.

| Sample | Coating Height (micrometers) | UV Power (W/in) | Silicon level (atomic %) |
|---|---|---|---|
| 1 | 1 | 200 (7.87 kW/m) | 2.8 |
| 2 | 2 | 125 (4.92 kW/m) | 3.1 |
| 3 | 2 | 200 (7.87 kW/m) | 3.7 |
| 4 | 2 | 200 (7.87 kW/m) | 4.2 |
| 5 | 2 | 300 (11.8 kW/m) | 3.5 |
| 6 | 4 | 200 (7.87 kW/m) | 3.4 |

Example 12

Samples were prepared using the release coating composition described in Example 10. The pavement marking tapes (all available from 3M) listed below were then electrosprayed as described in Example 10. A silicone transfer test was then conducted on each sample according to the following procedure. A sample was prepared by taking a one foot (0.3 m) by web width (0.33 m) sample without a carrier and cutting it into four 4-inch×6-inch (0.1 m×0.15 m) samples across the web. Five 4-inch×6-inch (0.1 m×0.15 m) samples of 6330 STAMARK™ Pavement Marking Tape (available from 3M) were also cut and the liner was peeled off of 4 of the 5 samples. A stack was formed by alternating the 6330 tape with the electrospray coated tape, ending with the linered 6330 tape sample on the bottom.

The stack was placed between two pieces of 0.25 inch (6.4 mm) plate glass with a 5-pound (2.27 kg) mass on the top center of the stack in an oven heated to 200° F. (93° C.) for about one hour. After the stack cooled to room temperature, the "middle" 6330 sample and the linered sample were selected and each was cut into three 25.4 mm strips. The strips were applied to stainless steel panels with five passes of a 5 pound (2.27 kg) roller. Then, the samples were conditioned at room temperature for about 5 minutes. Using a Sintech tensile strength instrument (#6365, available from Sintech, a division of MTS Systems Corp., Stoughton, Mass.), a 180° Peel Test was performed. The instrument had a jaw opening of 4 inches (0.1 m), a crosshead speed of 1 foot/min (0.3 m/min), and a 50 pound full scale load (222.5N).

With the exception of Samples #3 and #11, the test results were within the desired range of a differential of one pound (17.5N/100 mm) or less from the control.

| Sample | Pavement Marking Tape | Web Speed (fpm) | Coating Ht. (micrometers) | UV Power (W/in) | 180° Peel Sample (lb) | 180° Peel Control (lb) |
|---|---|---|---|---|---|---|
| 1 | 380 | 30 (9.14 m/min) | 1 | 200 (7.87 kW/m) | 6.40 (112N/100 mm) | 6.3 (110N/100 mm) |
| 2 | 380 | 30 (9.14 m/min) | 1 | 200 (7.87 kW/m) | 6.40 (112N/100 mm) | 6.3 (110N/100 mm) |
| 3 | 380 | 30 (9.14 m/min) | 2 | 125 (4.92 kW/m) | 4.5 (79N/100 mm) | 6.3 (110N/100 mm) |
| 4 | 380 | 30 9.14 m/min) | 2 | 200 (7.87 kW/m) | 6.10 (107N/100 mm) | 6.3 (110N/100 mm) |

-continued

| Sample | Pavement Marking Tape | Web Speed (fpm) | Coating Ht. (micrometers) | UV Power (W/in) | 180° Peel Sample (lb) | 180° Peel Control (lb) |
|---|---|---|---|---|---|---|
| 5  | 380 | 30 (9.14 m/min) | 2 | 200 (7.87 kW/m) | 7.10 (124N/100 mm) | 6.3 (110N/100 mm) |
| 6  | 380 | 30 (9.14 m/min) | 2 | 300 (11.8 kW/m) | 5.90 (103N/100 mm) | 6.3 (110N/100 mm) |
| 7  | 380 | 30 (9.14 m/min) | 4 | 200 (7.87 kW/m) | 6.60 (116N/100 mm) | 6.3 (110N/100 mm) |
| 8  | 380 | 30 (9.14 m/min) | 4 | 200 (7.87 kW/m) | 6.90 (121N/100 mm) | 6.3 (110N/100 mm) |
| 9  | 420 | 30 (9.14 m/min) | 2 | 125 (4.92 kW/m) | 5.30 (93N/100 mm)  | 6.3 (110N/100 mm) |
| 10 | 420 | 30 (9.14 m/min) | 2 | 200 (7.87 kW/m) | 6.10 (107N/100 mm) | 6.3 (110N/100 mm) |
| 11 | 420 | 30 (9.14 m/min) | 2 | 200 (7.87 kW/m) | 7.40 (130N/100 mm) | 6.3 (110N/100 mm) |
| 12 | 420 | 30 (9.14 m/min) | 2 | 300 (11.8 kW/m) | 5.50 (96N/100 mm)  | 6.3 (110N/100 mm) |

Example 13

The composition of Example 10 was electrosprayed as described in Example 10 onto the following pavement marking tapes at a one micrometer coating height.

Reflectrometry measurements were made using the procedures described in ASTM test method D4061-89, "Standard Test Method for Retroreflectance of l Coatings," using an entrance angle of 86.5° and an observation angle of 0.2°. Results are shown in the table below.

| Sample | Pavement Marking Tape | Web Speed (fpm) | Reflectivity (mcd/m²/lux) | Min. Acceptable Value (mcd/m²/lux) |
|---|---|---|---|---|
| 1 | 5730 | 90–120 (27.43–36.58 m/min) | 983  | ≧550  |
| 2 | 380  | 30 (9.14 m/min)            | 2131 | ≧1100 |
| 3 | 420  | 25 (7.62 m/min)            | 1150 | ≧700  |
| 4 | 330  | 80 (24.38 m/min)           | 1202 | ≧1092 |
| 5 | 331  | 80 (24.38 m/min)           | 835  | ≧819  |
| 6 | 620  | 80–100 (24.38–30.48 m/min) | 3130 | ≧1770 |
| 7 | 621  | 80–100 (24.38–30.48 m/min) | 1423 | ≧1310 |

Example 14

Electrospray samples were prepared from a master composition containing 100 parts 75/25 IOA/1,6-HDDA, 2 parts Darocur 1173, 0.5 parts Aliquat 336, and 1 part NNDMA. To prepare each sample, 0.1 parts 5K ACMAS (sample 1), 0.2 parts 5K ACMAS (sample 2), 0.3 parts 5K ACMAS (sample 3), and 10 parts 5K ACMAS (sample 4) were added. The samples were electrosprayed as described in Example 8 on 0.036 mm thick polyester film (3M) at a line speed of 17 meter/min. and cured in line under an inert atmosphere with one medium pressure mercury lamp at a power setting of 200 W/2.54 cm (about 7.9 kW/m).

The effectiveness of the release coating was measured by release and readhesion tests. The immediate release value (in N/100 mm) is a quantitative measure of the force required to remove a flexible adhesive tape (#810 tape available from 3M) from the electrospray coated polyester film at a specific angle and rate of removal. Typically, a 19 mm wide tape sample was laminated to the electrospray coated polyester film (1 pass at 30 cm/min with a 2 kg rubber covered roller) and the sample was tested immediately after roll-down using a slip/peel tester (Model 3M90 from Instrumentors, Inc.) at a rate of 30 cm/min and a peel angle of 180°.

The aged release testing was conducted in a similar manner with the exception of allowing the adhesive tape/coated polyester film sandwich to age for three days at 65° C.

Readhesions (both immediate and aged (three days at 65° C.)) were measured (reported in N/100 mm) by adhering the freshly pulled tape to a clean glass plate and measuring the peel adhesion as described earlier.

| Sample | Parts silicone | Immediate release (N/100 mm) | Aged release (N/100 mm) | Immediate readhesion (N/100 mm) | Aged readhesion (N/100 mm) |
|---|---|---|---|---|---|
| 1 | 0.10 | 2.5  | 9.8  | 23 | 25 |
| 2 | 0.20 | 1.6  | 3.9  | 25 | 29 |
| 3 | 0.30 | 0.29 | 1.6  | 25 | 31 |
| 4 | 10   | 0    | 0.58 | 23 | 31 |

As the data indicated, the release may be tailored from tight to easy by a simple change in the silicone content. The release builds after heat-aging, but the readhesion is essentially unaffected, thus showing good cure of the composition.

Example 15

A masterbatch was prepared by mixing at room temperature 100 g of a 75:25 mixture of IOA/1,6-HDDA, 25 g 5K MAUS, and 2 parts Darocur 1173. The current was measuring using Method III and found to be zero. To this masterbatch, 0.5 parts GE 9380C iodonium salt was added as a conductivity enhancer. The resistance was measured using Method II at a height H=4 cm, and was 937 kΩ (conductivity is 15.9 $\mu$S/m). Then, 1 part NNDMA was added and the resistance was again measured an decreased to 501 kΩ (conductivity is 29.7 $\mu$S/m). Both of these mixtures have conductivities in the most preferred range.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A free-radically polymerizable release coating composition comprising:
    a) about 100 parts by weight of one or more free radically polymerizable vinyl monomer(s);
    b) from about 0.05 to about 250 parts by weight of one or more polydiorganosiloxane polymer(s) which are copolymerizable with said vinyl monomer(s); and
    c) from about 0.10 to about 10 parts by weight, based on 100 parts by weight of (a) and (b), of one or more non-volatile conductivity enhancer(s) which are soluble in said vinyl monomer(s) and which do not interfere with polymerization;
wherein said composition is electrosprayable.

2. The composition according to claim 1 wherein said composition is solvent-free.

3. The composition according to claim 1 wherein said polydiorganosiloxane polymer(s) are selected from the group consisting of polymers falling within the general formula:

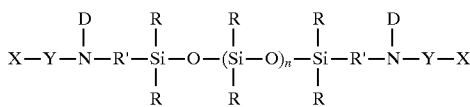

and mixtures thereof, wherein:
- X are monovalent moieties having ethylenic unsaturation which can be the same or different;
- Y are divalent linking groups which can be the same or different;

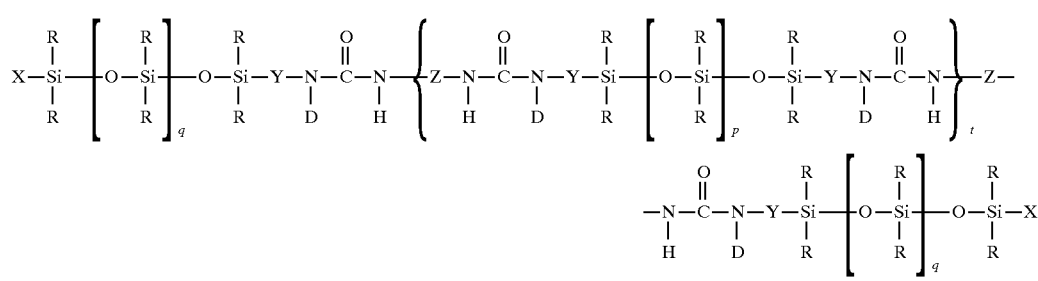

- D are monovalent moieties which can be the same or different selected from the group consisting of hydrogen, an alkyl group of 1 to about 10 carbon atoms, and aryl;
- each R is a monovalent moiety selected from alkyl moieties which may be substituted with trifluoroalkyl or vinyl groups, cycloalkyl moieties which may be substituted with alkyl, fluoroalkyl, and vinyl groups, aryl moieties which may be substituted with alkyl, cycloalkyl, fluoroalkyl and vinyl groups;
- R' are divalent hydrocarbon groups which can be the same or different; and
- n is an integer of about 25 to about 750.

4. The composition according to claim 1 wherein said polydiorganosiloxane polymer(s) are selected from the group consisting of polymers obtained by the reaction of epoxy-functional polysiloxane of the general formula

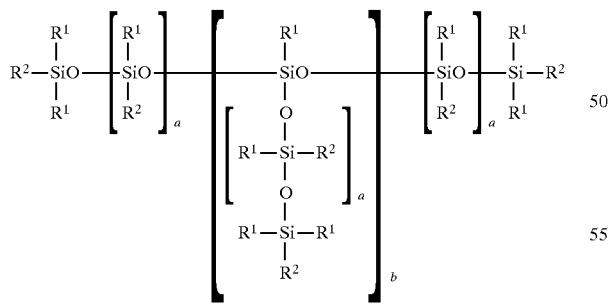

in which
- $R^1$ are the same or different low molecular weight alkyl groups with 1 to 4 carbon atoms or phenyl groups,
- $R^2$ is the same as $R^1$ or represents the $R^3$ group, 70 to 100% of the $R^3$ groups being epoxy functional groups and 30 to 0% being alkyl groups with 2 to 20 carbon atoms or hydrogen, with the proviso that the average molecule contains at least 1.5 epoxy groups,
- a is an integer having a value of 1 to 1,000 and
- b is an integer having a value of 0 to 10, with such amounts of an acid mixture, consisting of
  - (a) 10 to 90 mole percent of (meth)acrylic anhydride, and
  - (b) 90 to 10 mole percent of (meth)acrylic acid that the sum of (a) and (b) adds up to 100 mole percent, and that there are present 0.8 to 1.9 acid equivalents per epoxide equivalents.

5. The composition according to claim 1 wherein said polydiorganosiloxane polymer(s) are selected from the group consisting of polydiorganosiloxane oligourea segmented copolymer compositions of the general formula wherein
- each Z is a divalent radical selected from arylene radicals and aralkylene radicals, alkylene and cycloalkylene radicals;
- each R is a monovalent moiety selected from alkyl moieties which may be substituted with trifluoroalkyl or vinyl groups, cycloalkyl moieties which may be substituted with alkyl, fluoroalkyl, and vinyl groups, aryl moieties which may be substituted with alkyl, cycloalkyl, fluoroalkyl and vinyl groups;
- each Y is a divalent moiety selected from alkylene radicals, aralkylene radicals and arylene radicals;
- each D is a monovalent radical selected from hydrogen, alkyl radicals, aryl or arylalkyl radicals; and
- p is a number which is about 10 or larger;
- q is a number which is about 10 or larger;
- t is a number which is 0 to about 8; and
- each X is
  - (a) a moiety represented by

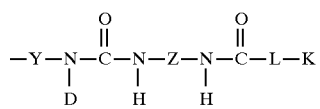

where each of Z, Y, and D are defined as above,
L is

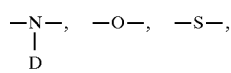

K is a free radically curable end group; or (b) a moiety represented by

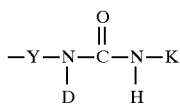

wherein D, Y, and K are defined as above.

6. The composition according to claim 1 wherein the polydiorganosiloxane polymer(s) comprise from about 0.05 to about 200 parts by weight.

7. The composition according to claim 1 wherein the conductivity enhancer(s) are selected from the group consisting of ampholytic acid-base pairs and onium salts of the elements in Group Va, VIa, or VIIa.

8. The composition according to claim 7 wherein the ampholytic acid-base pairs are selected from the group consisting of N,N-dimethyl aminoethyl(meth)acrylate/(meth)acrylic acid, methacrylic acid/diethanolamine, acrylic acid/2-vinylpyridine, itaconic acid/2-diethylaminoethyl acrylate, methacrylic acid/2-diethylaminoethyl acrylate, acrylic acid/2-diethylaminoethyl acrylate, acrylic acid/2-diethylaminoethyl methacrylate, N-vinylglycine, p-styrenesulfonic acid/4-vinylpyridine, ethylenesulfonic acid/4-vinylpyridine, 1-vinyl-3-(3-sulfopropyl)imidazolium hydroxide inner salt, 1-vinyl-2-methyl-3-(3-sulfopropyl) imidazolium hydroxide inner salt, 1-vinyl-3-(4-sulfobutyl) imidazolium hydroxide inner salt, 1-vinyl-2-methyl-3-(4-sulfobutyl) imidazolium hydroxide inner salt, 1-vinyl-3-(2-sulfobenzyl) imidazolium hydroxide inner salt, 2-vinyl-1-(3-sulfopropyl)pyridinium hydroxide inner salt, 2-methyl-5-vinyl-1-(3-sulfopropyl)pyridinium hydroxide inner salt, 4-vinyl-1-(3-sulfopropyl)pyridinium hydroxide inner salt, dimethyl-(2-methacryloxyethyl)(3-sulfopropyl)ammonium hydroxide inner salt, diethyl-(2-methacryloyloxyethoxy-2-ethyl)(3-sulfopropyl)ammonium hydroxide inner salt, 4-vinyl-4-(sulfobutyl)pyridinium hydroxide inner salt, 2-vinyl-2-(4-sulfobutyl)pyridinium hydroxide inner salt, N-(3-sulfopropyl)-N-methacrylamido-propyl-N,N-dimethylammonium betaine, N-(3-carboxypropyl)-N-methacrylamido-ethyl-N,N-dimethylammonium betaine, 4-vinylpiperidinium ethanecarboxy-betaine, 4-vinylpyridinium methanecarboxy-betaine, 4-vinylpyridinium/p-styrenesulfonate, 4-vinyl-N-methylpyridinium/p-styrenesulfonate, and 2-methacryloylethyltrimethylammonium/2-methacryloyloxyethanesulfonate.

9. The composition according to claim 7 wherein the onium salt is selected from the group consisting of

wherein at least one R is a hydrocarbon having from about 1 to about 18 carbon atoms and each other R is a hydrogen or a hydrocarbon having from about 1 to about 18 carbon atoms, B is a Group Va, VIa, or VIIa element, n is an integer from 2 to 4, and A is an inorganic anion.

10. The composition according to claim 9 wherein A is selected from the group consisting of sulfate, borate, nitrate, thiocyanate, perchlorate, and halogens such as iodide, chloride, and bromide.

11. The composition according to claim 7 wherein the onium salt is selected from the group consisting of tetraoctylammonium chloride, tetrabutylammonium bromide, tetrabutyl ammoniumthiocyanate, and tetrabutylphosphonium-bromide.

12. The composition according to claim 1 wherein at least one part of said conductivity enhancer is co-polymerizable.

13. The composition according to claim 1 wherein said free radically polymerizable vinyl monomer(s) are selected from the group consisting of divinyl benzene, acrylates, methacrylates, and mixtures thereof.

14. The composition of claim 13, wherein said free radically polymerizable vinyl monomer(s) are selected from the group consisting of beta-acryloxypropionates of alkyl polyols, their ethoxylated and propoxylated analogs, styrene, butyl acrylate, hexyl acrylate, benzyl acrylate, cyclohexyl acrylate, isobornyl acrylate, isooctyl acrylate, isononyl acrylate, isodecyl acrylate, lauryl acrylate, 2-ethylhexyl acrylate, octadecyl acrylate, butyl methacrylate, isobornyl methacrylate, isooctyl methacrylate, tetrahydrofurfuryl acrylate, vinyl pivalate, vinyl 2-ethyl hexanoate, and mixtures thereof.

15. The composition according to claim 1 further comprising at least 0.1 part by weight based on 100 parts by weight (a) and (b) of one or more dissociation enhancing agent(s).

16. The composition according to claim 15 wherein said dissociation enhancing agent(s) are selected from the group consisting of polyethylene glycols, glycerols, propylene carbonates, poly(ethylene oxides), dialkyl ureas, N,N-dimethyl acrylamide, N-vinyl pyrrolidone, methacrylic acid, 2-ethoxyethyl acrylate, and polyethyleneglycol acrylate.

17. The composition according to claim 15 wherein said dissociation enhancing agent(s) have a dielectric constant of at least 5° at 20° C.

18. The composition according to claim 1 further comprising about 0.1 to about 5 parts by weight based on 100 parts by weight of (a) and (b) of one or more free radical initiator(s).

19. The composition according to claim 18 wherein said free radical initiator(s) are selected from the group consisting of benzoin ethers, acetophenone and derivatives thereof, benzophenone and derivatives thereof, and anthraquinone.

20. The composition of claim 19, wherein said free radical initiator is selected from the group consisting of such as 2,2-dimethoxy-2-phenyl acetophenone, 2-hydroxy-2-methyl-1-phenylpropan-1-one,2,2,2-trichloroacetophenone, and 4,4'-bis(dimethylamino)benzophenone.

21. The composition according to claim 18 wherein said free radical initiator(s) are selected from the group consisting of peroxides and azo compounds.

22. The composition according to claim 1 wherein viscosity measures from about $10^{-3}$ Pa·s to about 1 Pa·s.

23. The composition according to claim 1 wherein conductivity ranges from about 0.1 $\mu$S/m to about 100,000 $\mu$S/m.

24. The composition according to claim 1 wherein conductivity ranges from about 1 $\mu$S/m to about 1,000 $\mu$S/m.

25. A substrate having two major surfaces wherein the composition according to claim 1 is electrosprayed on at least a portion of at least one major surface.

26. The substrate according to claim 25 wherein said composition is polymerized subsequent to application to said substrate via electrospray.

27. The substrate according to claim 25 wherein said substrate is selected from the group consisting of poly (propylene), poly(ethylene), poly(vinyl chloride), poly (tetrafluoroethylene), polyester, polyimide film, cellulose acetate, ethyl cellulose, woven fabric, nonwoven fabric, paper, cotton, nylon, rayon, glass, metal, metallized polymeric film, ceramic sheet material, abrasives, natural or synthetic rubber, and pavement marking tapes.

28. A method of applying a release coating composition comprising one or more polydiorganosiloxane polymer(s), one or more free-radically polymerizable vinyl monomer(s), and optionally one or more free-radical polymerizing initiator(s), such that when in combination they have a conductivity insufficient to be electrosprayed, said method comprising the steps of (a) adding one or more non-volatile conductivity enhancer(s) which are soluble in said vinyl monomer(s) and which do not interfere with polymerization and optionally one or more dissociation enhancing agent(s) to said composition yielding an application composition;

(b) applying said application composition to a substrate by means of electrospray; and then (c) polymerizing said application composition.

29. The method according to claim 28 wherein said substrate is selected from the group consisting of poly(propylene), poly(ethylene), poly(vinyl chloride), poly(tetrafluoroethylene), polyester, polyimide film, cellulose acetate, ethyl cellulose, woven fabric, nonwoven fabric, paper, cotton, nylon, rayon, glass, metal, metallized polymeric film, ceramic sheet material, abrasives, natural or synthetic rubber, and pavement marking tapes.

30. A substrate comprising:

a) a backing having first and second sides;

b) an adhesive layer having two sides, one side coated to the first side of said backing; and c) a release layer on the second side of said backing comprising a polymerized composition according to claim 1.

31. The substrate according to claim 30 wherein said composition is electrosprayed onto the second side of said backing.

32. The substrate according to claim 30 wherein said substrate is rolled such that the adhesive layer contacts the release layer.

* * * * *

UNITED STATES PATENT AND TRADEMARK OFFICE
CERTIFICATE OF CORRECTION

PATENT NO. : 5,858,545

DATED : January 12, 1999

INVENTOR(S) : Everaerts et al.

It is certified that error appears in the above-identified patent and that said Letters Patent is hereby corrected as shown below:

Column 28, line 4, after "methacrylates," insert --beta-acryloxy propionates of alkyl polyols, their ethoxylated and propoxylated analogs,--.

Column 28, line 7-8, after "of" delete --beta-acryloxypropionates of alkyl polyols, their ethoxylated and propoxylated analogs,--.

Signed and Sealed this

Seventh Day of September, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,858,545
DATED : January 12, 1999
INVENTOR(S) : Albert I. Everaerts et al.

It is certified that error appears in the above-identified patent and that said Letters Patent is hereby corrected as shown below:

Column 8,
Line 36, "at least 5° at 20°C." should read -- at least 5 at 20°C. --
Line 38, "at least 20° at 20°C." should read -- at least 20 at 20°C. --

Column 12,
Line 14, "atoms; an" should read -- atoms; and --.

Column 15,
Line 1, "conductivity a," should read -- conductivity σ --.

Column 16,
Lines 10-12, the formula should read $$-- \sigma = g \Big/ H\left(\frac{[I_c R_c]}{I_s} - R_s\right). --$$

Line 67, "IOA/,1,6-HDDA" should read -- IOA/1,6-HDDA --.

Column 18,
Line 22, "ajar" should read -- a jar --.
Line 40, "ajar" should read -- a jar --.

Column 19,
Line 51, "breadup" should read -- breakup --.

Column 23,
Line 22, "of 1 Coatings" should read -- of Horizontal Coatings --.

Column 24,
Lines 37-38, "measuring" should read -- measured --.
Line 43, "measured an decreased" should read -- measured and decreased --.

UNITED STATES PATENT AND TRADEMARK OFFICE
CERTIFICATE OF CORRECTION

PATENT NO.    : 5,858,545
DATED         : January 12, 1999
INVENTOR(S)   : Albert I. Everaerts et al.

It is certified that error appears in the above-identified patent and that said Letters Patent is hereby corrected as shown below:

Column 28,
Line 27, "at least 5° at 20°C" should read -- at least 5 at 20°C. --

Column 29,
Line 2, after "initiator(s)" kindly insert -- being --.

Signed and Sealed this

Twenty-third Day of April, 2002

Attest:

Attesting Officer

JAMES E. ROGAN
Director of the United States Patent and Trademark Office